United States Patent
Solan et al.

(10) Patent No.: US 11,461,362 B2
(45) Date of Patent: *Oct. 4, 2022

(54) MERKLE SUPER TREE FOR SYNCHRONIZING DATA BUCKETS OF UNLIMITED SIZE IN OBJECT STORAGE SYSTEMS

(71) Applicant: EMC IP Holding Company LLC, Hopkinton, MA (US)

(72) Inventors: Alex Solan, Hertzelia (IL); Jehuda Shemer, Kfar Saba (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 412 days.

This patent is subject to a terminal disclaimer.

(21) Appl. No.: 16/803,918

(22) Filed: Feb. 27, 2020

(65) Prior Publication Data

US 2021/0232595 A1    Jul. 29, 2021

Related U.S. Application Data

(63) Continuation-in-part of application No. 16/776,129, filed on Jan. 29, 2020.

(51) Int. Cl.
*G06F 17/00* (2019.01)
*G06F 16/27* (2019.01)
*G06F 16/22* (2019.01)

(52) U.S. Cl.
CPC .......... *G06F 16/27* (2019.01); *G06F 16/2246* (2019.01); *G06F 16/2255* (2019.01); *G06F 16/2282* (2019.01)

(58) Field of Classification Search
None
See application file for complete search history.

(56) References Cited

U.S. PATENT DOCUMENTS

| | | | |
|---|---|---|---|
| 9,705,730 B1* | 7/2017 | Petri | H04L 67/1095 |
| 10,608,824 B1* | 3/2020 | Praus | H04L 9/083 |
| 2010/0094907 A1* | 4/2010 | Cohen | G06F 16/10 707/E17.009 |
| 2016/0110261 A1* | 4/2016 | Parab | H04L 9/12 707/692 |
| 2018/0285996 A1* | 10/2018 | Ma | H04L 9/3297 |
| 2019/0197562 A1* | 6/2019 | Woerner | H04L 9/3228 |
| 2019/0268308 A1* | 8/2019 | Sinha | G06F 16/2255 |

(Continued)

FOREIGN PATENT DOCUMENTS

CN    109165224 A *  1/2019 ......... G06F 21/6227

*Primary Examiner* — Hasanul Mobin
(74) *Attorney, Agent, or Firm* — Staniford Tomita LLP

(57) ABSTRACT

Embodiments extend using sparse Merkle trees for smart synchronization of S3 buckets by overcoming fixed size limitations through creating another Merkle tree when the fixed size limit of the first tree is exceeded, and creating yet another tree when the second tree is filled up, and so on as needed. The method maintains a super Merkle tree of trees, in which each tree can be synchronized separately by keeping a strict division to trees according to generation number. The generation is passed from a source site to a target site during replication operations. Syncing between two data sites is efficient as the super Merkle tree of the source is synced with the super Merkle tree of the target using the hashes on the nodes, as in normal Merkle tree sync operations.

18 Claims, 12 Drawing Sheets

(56) References Cited

U.S. PATENT DOCUMENTS

| | | | |
|---|---|---|---|
| 2020/0073962 A1* | 3/2020 | Natarajan | H04L 9/0643 |
| 2020/0204349 A1* | 6/2020 | Sardesai | H04L 63/123 |
| 2020/0344132 A1* | 10/2020 | Padmanabhan | H04L 41/22 |
| 2020/0379977 A1* | 12/2020 | Saket | H04L 9/3239 |
| 2020/0382283 A1* | 12/2020 | Irazabal | G06F 7/556 |
| 2021/0014042 A1* | 1/2021 | Sivathanu | H04L 9/0656 |

* cited by examiner

650

POST
Create a New Object

652

PUT
Update an Existing Object

654

DELETE
Delete an Existing Object

MERKLE SUPER TREE FOR SYNCHRONIZING DATA BUCKETS OF UNLIMITED SIZE IN OBJECT STORAGE SYSTEMS

CROSS-REFERENCE TO RELATED APPLICATION

This application is a Continuation-In-Part Application of U.S. patent application Ser. No. 16/776,129, filed on Jan. 29, 2020, which is incorporated herein by reference for all purposes.

TECHNICAL FIELD

Embodiments are generally directed to large-scale data storage, and more specifically to providing a Merkle super tree for object storage data buckets of unlimited size.

BACKGROUND

Object storage systems involve data that is managed as objects as opposed to hierarchical files. Each object typically includes the data, metadata, and a globally unique identifier. This allows storage systems to store massive amounts of unstructured data, and can be implemented at many levels, including device level, system level, and interface level. Object storage represents a type of key-value storage that uses an associative array to link a unique key to a value in the data collection to form a key-value pair.

The Amazon Simple Storage Service ("S3") is an example of service that provides object storage through a web service interface. Amazon S3, and other similar key-value or object storage systems, is used to store any type of data object for Internet applications, backup and recovery, disaster recovery, data archives, data lakes for analytics, and hybrid cloud storage. The basic storage units of Amazon S3 are objects that are organized into buckets. Each object is identified by a unique, user-assigned key. Data can be can accessed through the S3 service from any where on the Internet, and requests are authorized using an access control list associated with each object bucket.

A Merkle tree is a tree data structure where every node is referenced by a hash. The hash is created by hashing the contents of the node and any child nodes so that at each node, the hash is dependent on all direct descendent hashes. Synchronizing data using Merkle Trees is a known methodology in the industry, but present methods operate on block-like data, which is data that can be easily represented as an array of bytes, whose size is fixed. In S3 or any other object storage, the data is not organized as a flat array. Certain solutions have been discovered to overcome this by utilizing the fact that the main property of array-like data is that in the Merkle Tree, the topology is fixed where each node always represents the same data location (metadata) and only the data itself changes. A development using sparse Merkle tree data structures for synchronization of S3 data buckets uses Merkle trees with a fixed size and a fixed number of leaves. The size was defined by using some limitation on the S3 bucket size and multiplying it by a small constant to ensure source and target trees match in size, which is needed for Merkle tree synch algorithms to create a large enough address space for use of hashes. Although sparse trees help to overcome the waste of a relatively large tree on small buckets, there are certain problems growing beyond this fixed size limit.

What is needed, therefore, is a way to synchronize S3 buckets using Merkle Trees without a size limitation.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 6 illustrates a set of operations for data in a Merkle tree forest, under some embodiments.

DETAILED DESCRIPTION

Figure 1A:
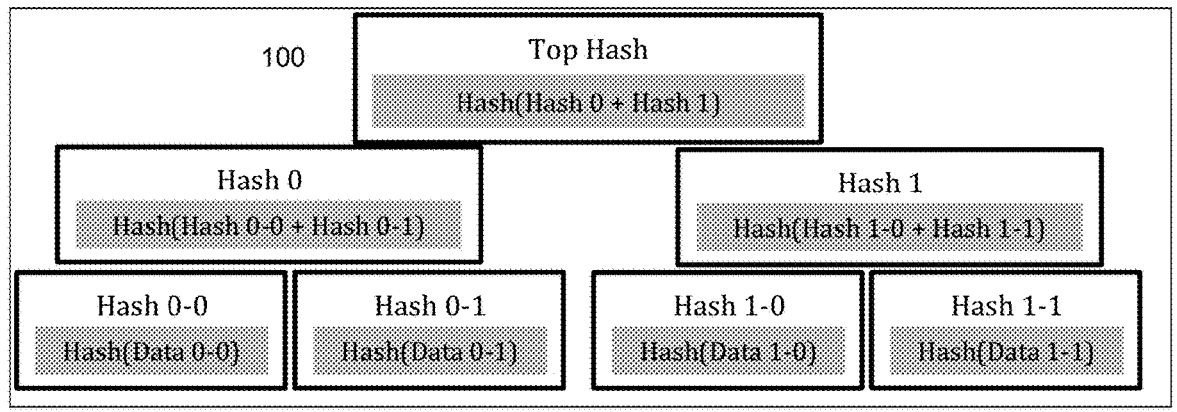
FIG. 1A illustrates an example of a Merkle tree structure that may be used in conjunction with certain embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard-coded in hardware or take the form of software executing on a general purpose computer or be hardwired or hard coded in hardware such that when the software is loaded into and/or executed by the computer, the computer becomes an apparatus for practicing the processes described herein. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the described embodiments.

Embodiments are directed to a processing component in or associated with a server computer that expands on the development of using sparse Merkle trees for smart synchronization of S3 buckets by overcoming fixed size limitations through creating another Merkle tree when the fixed size limit of the first tree is exceeded, and creating yet another tree when the second tree is filled up, and so on as needed.

As stated above, a Merkle tree is a tree data structure where every node is referenced by a hash. The hash is created by hashing the contents of the node, including any children the node may have. At each node, the hash is dependent on all direct descendent hashes (children). FIG. 1A illustrates an example of a Merkle tree structure 100 that may be used in conjunction with certain embodiments. As shown in FIG. 1A, a top hash level has children Hash_0 and Hash_1, which respectively have children Hash_0-0 and Hash_0-1, and Hash_1-0 and Hash_1-1. Hashes at each level are dependent on the hash value or values below. If any hash changes then the parent hash will change and these changes are percolated up to the top of the tree. Changes to the hash value of a node may occur due to a change in the data at the node or the addition/deletion/change to any of its child nodes. Conversely, if a hash at a certain level has not changed, this indicates that no hash or data below has changed either. This represents the power of Merkle trees, namely they provide an extremely efficient method of determining if large sets of data has not changed. The properties of the Merkle tree thus provide very efficient storage of a system changing over some period of time.

Merkle trees are generally built from the bottom-up, i.e., hash values of children determine the hash of a parent and so on up the tree. Because of this a Merkle tree has only downward pointing references because a node at one level has a value that is only dependent on itself and its immediate child nodes. If data of one of the blocks changes (for example L2 in the above image) hash(L2) needs to be calculated, and then all the hashes up the tree to the root also need to be recalculated. This means that for a disk with n blocks O(log n) hashes need to be updated for every change in data. As an example, a 1 TB disk has 2 billion blocks with a binary tree depth of 31 e.g. and update operation requires 31 hash operations just to update the tree.

Figure 1B:
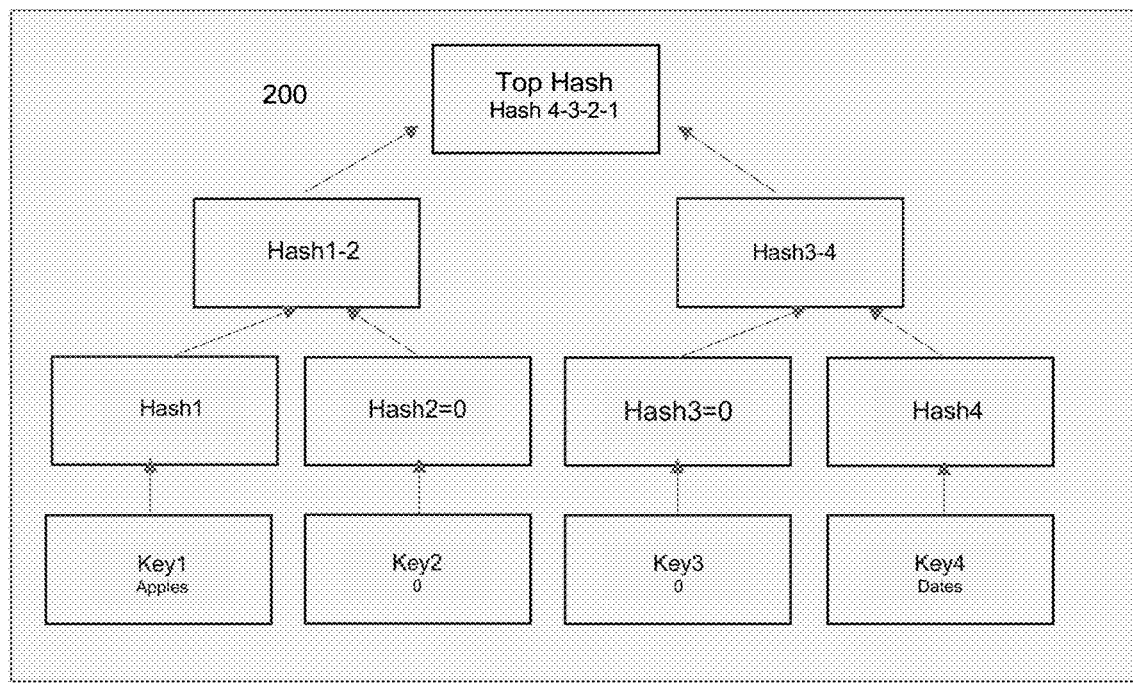
FIG. 1B illustrates an example fixed-size Merkle tree, such as that of FIG. 1A, in which there are only two elements.

In a related development, Merkle trees have been used to synchronize S3 buckets using the fact that the main property of array-like data is that in the Merkle tree, the topology is fixed with each node always representing the same data location with only the data itself changing. In an embodiment, sparse Merkle trees were developed to still keep this rule, i.e., each key is always represented by the same node. This is done by putting a limit on the number of elements allowed in the bucket and create an initial tree of size M=c*n, where n is the maximum allowed number of elements in the bucket, and c is a constant, typically 2, 3, or 4. For each key, the system uses a hash function to create a number between 0 to M−1, to determine the location of the key, so each key is represented in a leaf in the form of hash(key) % M. The leaf contains the hash of the value of the key and its parent node, as usual has the hash of the hashes of its children in the tree. FIG. 1B illustrates an example fixed-size Merkle tree, such as that of FIG. 1A, in which there are only two elements. In the example in FIG. 1B, it can be seen that such a tree 200, which size is four has only two elements "Apples" (Key1) and "Dates" (Key4).

Data synchronization involves configuring two separate or remote disks so that they have the same data. In an object storage system, such as an S3 system, the disks hold data buckets. With respect to the use of Merkle trees for data synchronization, embodiments improve on the basic approach of simply having both disks send all data or hashes of data between the disks and then comparing the result. In an embodiment, Merkle trees are used to synchronize the disks, such that the process involves: reading disk1 and creating a Merkle tree (Tree1), reading disk2 and creating a Merkle tree Tree2, and then traversing the trees using a special function. In an embodiment, the special function can be represented by the following computer code example (pseudo code, run Tree2):

```
Function MerkleSync(node) {
    Hash1 = Get_hash_of_same_node_in_tree1
    If Hash1 == node.hash
        Return; //Hashes match. Subtree matches. Done.
    //if we got to here there is a difference in the subtree
    If node.isLeaf
        Get_data_of_same_node_in_tree1
    else
        //recursively scan the children
        foreach child of node
            MerkleSync(child)
}
```

It should be noted that Tree1 and Tree2 are identical in structure as the size of the disks needs to match. The improvement here is that only a subset of hashes need to be transferred. If only a specific area of the disk had changes, only hashes and blocks of that area in the subtree are transferred. The complexity of building the tree is offset by significant reductions in data transfer.

When protecting an object store (S3), the user can add, remove or modify any number of keys. To use Merkle trees there must be some consistent mapping between the keys and the leaves of the Merkle tree (a leaf index for example). Therefore, the mapping is a function given as: Map(key) →Number.

Sparse Merkle Trees

The requirement to maintain a consistent mapping between the keys and leafs of the Merkle tree is addressed in one embodiment by the use of sparse Merkle trees. In this case, it is required that the mapping have the following characteristics: (1) determinism—applying the mapping to same key will calculate the same result; (2) stability—adding new keys will not modify the mapping results of existing keys (or at least not a large number of them); (3) stability on removal—removing a key will not modify the mapping results of existing keys; (4) steadiness—any of the above operations should not cause the tree topology to change with the resulting costly rebalancing; and (5) efficiency—it should be computationally lightweight to calculate ($O(\log(n))$). In other words, there needs to be a stable base to the tree.

In an embodiment, the mapping function uses Hash(key), with a modification as described below. Hashes are stable functions that are not affected by other keys and therefore will meet the criteria listed above. If a key is mapped to the leaf index using the hash of the key, it guarantees that it will always get to the same index (and therefore the same leaf node) regardless of the existence and status of other keys. To stay within a reasonable size of tree base, the process needs to limit the value it gets from the mapping function. For example, if it uses a 64-bit hash it will result in a tree base so big that it is not practical. Therefore, it needs a hash function with a small enough target range or limit our function somehow. It can be chosen to limit the function to some maximum number M by using modulo so that the mapping is:

$$\text{Map}(key) = \text{Hash}(key) \% M$$

The result is a tree with a constant base size M. The hash function above is applied to the keys. This is opposed to the internal Merkle tree construction on which hashes are applied to the data. It should be noted that hash functions need a large enough range in order that there will not be too many hash collisions. The range must be at least two to three times the number of items handled. There is no necessity to use Hash(key) % M. Any mapping function that meets the criteria and has a limited target range can be used.

There is a defined constant M that defines the number of leaves in the base of the Merkle tree. In an example where M is 100000, this means that even if the tree is empty, there is still a Merkle tree spanning across M leaves. This is a great many hashes to calculate on empty data. Note that these are the internal data hashes, not mapping function hashes.

A sparse Merkle tree is defined as a Merkle tree where empty nodes hash is defined as 0. This includes nodes within the tree, e.g., if all children of a node are 0 then the nodes hash is also 0. Empty nodes as such are called Zero Nodes. The definition of Zero Nodes as defined allows for an efficient implementation of the sparse tree: zero nodes do not really need to be allocated. This includes zero node subtrees. Therefore, a large and empty tree does not take up that much space. Caution needs to be exercised when implementing iterators: iterators should iterate over zero nodes and their children as usual, even if the zero nodes are not allocated.

Figure 2:
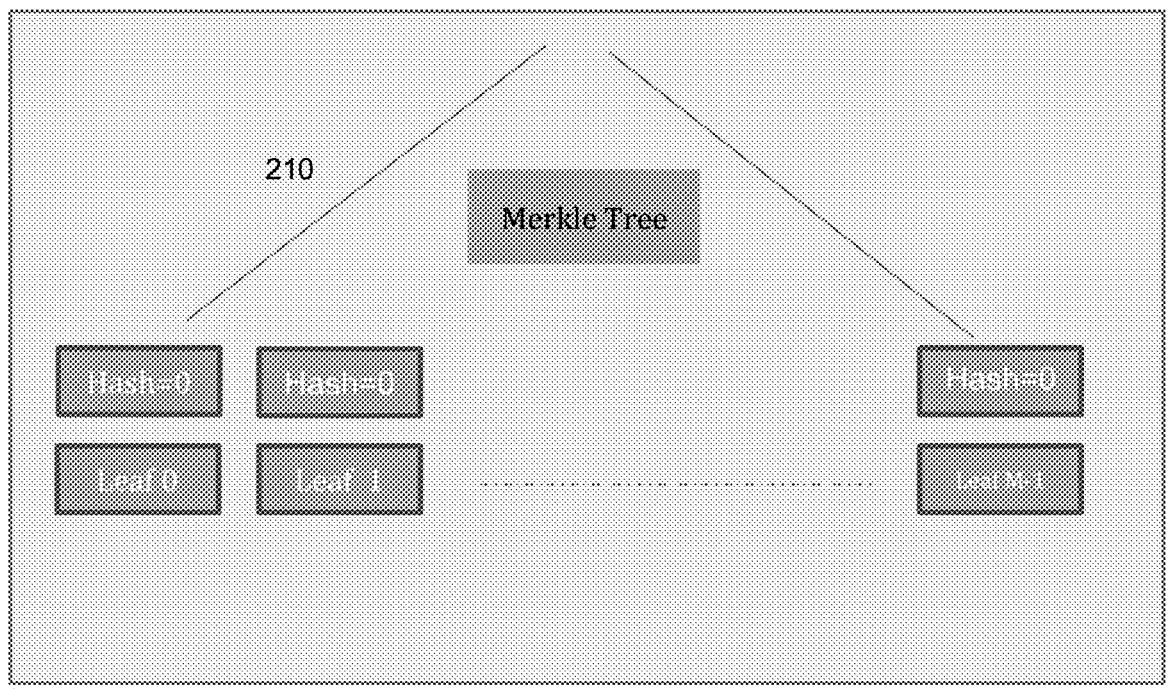
FIG. 2 illustrates an example initial Merkle Tree for an empty S3 bucket.
Figure 3:
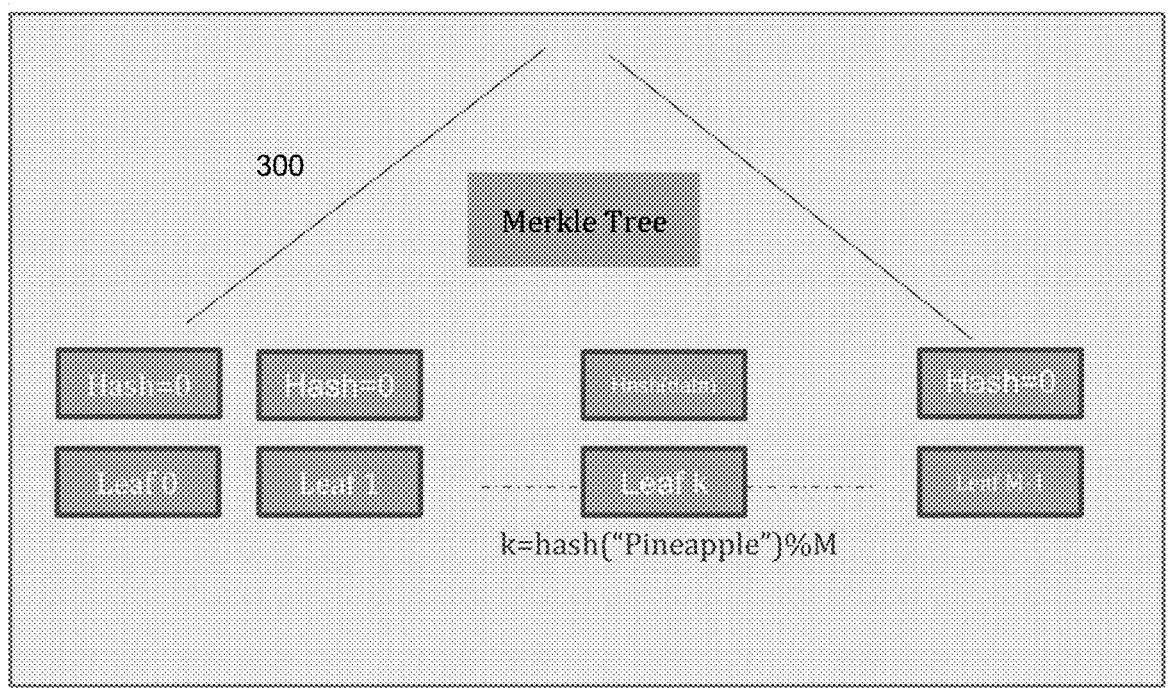
FIG. 3 illustrates adding an S3 object key example to a Merkle tree.

To create a Merkle tree for an S3 bucket, a hash function is used to map keys and a sparse Merkle tree. With respect to S3 protection, to overcome the dynamic number of items in S3, there will be a maximum limit of the items that are supported (maximal number of keys). This number can be denoted n. A sparse Merkle tree will be created which represents $c*n$ leaves, where c is typically a small number, such as 2, 3, 4, etc. The number c is a scaling factor to have a large enough range to reduce hash collisions. The value of M is declared to be $M=c*n$. Operations on the tree are still $O(\log n)$ as c is a small fixed constant. For an empty tree, there will be a tree with $c*n$ hash-s which are 0. FIG. 2 illustrates an example initial Merkle tree 210 for an empty S3 bucket. For each new element to insert into the tree, its hash(key) % M will be calculated as its leaf location in the tree. For instance, suppose there is a new Key="Pineapple", the process will calculate hash("Pineapple") % M, get a number k, between 0 and M−1, and this will be the location for the element in the tree base above. It will calculate the data hash (not using a mapping function but the standard Merkle tree data hash same as done for block devices), and this will be the node hash. FIG. 3 illustrates adding an S3 object key example to a Merkle tree 300 in which the S3 object key="Pineapple" is added to the Merkle tree.

There can again be a situation that a new element takes log(n) hash calculations to enter and it does not change the structure of the tree. To handle hash collisions, there is defined the following method. The process will first extend each leaf to an ordered list of leaves and the hash be the hash of all the hashes of the members. There will not be too many of such lists, so it will not influence the complexity of the algorithm (the collision rate can be controlled using the constant c). Other traditional options are to resolve collisions such as rehashing, open addressing, or other chaining variants to the above are all possible, but they may require adjustments to the Merkle tree hash calculation. The important traits are: (1) the order of item insertion should not matter (which is why an ordered list was used), (2) the tree topology should not change (no nodes added/removed), and (3) there is a small number or no existing key moves.

To protect an S3 bucket, a sparse Merkle tree as described for both the source and the replica (target) buckets can be created. When there are two such trees representing source and target S3 buckets, the process can compare and synchronize them. It should be noted that empty nodes in the source may delete objects on the target S3 bucket.

One possible downside of this method is that if the number of elements is much smaller than M, it wastes calculations, because the depth of the tree is log(c*n). While still asymptotically equivalent it does have real life computational implications.

One optimization to overcome this is to shortcut hashes of zero nodes with other hashes. For example, hash(hashvalue, 0) so that 0 nodes do not require additional rehashing. This must be done with care as the order of the child nodes still needs to be preserved and a naïve approach will mean hash(hashvalue, 0)==hash(0, hashvalue). It can be done by concatenating hashvalue_0 or 0_hashvalue or otherwise dedicating one bit (in a binary tree, more otherwise) to determine the child leaf number. Regardless of the methods, significant computational complexity can be reduced by simple techniques around calculating hashes with zero nodes.

Another possible downside is the situation in which the process grows more than the estimated n items. There is some tolerance to surpass n but at some point (depending on the value of c) hash function collisions will rise.

Using a sparse Merkle tree for smart synchronization of S3 buckets, as described above in which a Merkle tree with a fixed size is used, helps to ensure the source and target trees match in size. Such sparse trees overcome the waste of a relatively large tree on small buckets, however, there is still a problem growing beyond this fixed size limit. Embodiments include creating successive additional trees to overcome this fixed size limit.

As just described, present synchronization of S3 bucket methods assume that there is a limit on the bucket size in order to calculate the leaf location in the tree in an efficient manner. Making an estimation regarding bucket size is often both wasteful and non-scalable. If the bucket size is estimated too low, there is no room to grow; while estimating it too high results in more waste for unused areas and excess calculations. Simply growing the Merkle tree will result in significant rehashing. For key hashing to work correctly, when changing the base of the tree, all existing keys will need to be rehashed. This is an expensive step that should be avoided. In addition, changing the tree topology interferes with the Merkle trees synchronization algorithms. The sync algorithms rely on matching the tree topologies in source and target trees. The user must also make decisions regarding the number of elements. It is advantageous to have the user make a minimal number of decisions. In the case where the user must think and make an estimation about the system, a wrong estimate may have severe implications and the user does not have an efficient way to fix any issues.

Merkle Tree Forest

Embodiments of an S3 bucket synchronization process involve adding one or more additional Merkel trees when the limit of a tree has been reached. In order to effectively add trees, it is necessary to coordinate between the source and target in what tree should the keys be placed. The process tags all the elements in S3 with a 'Merkle_Generation' tag. The first tree is tagged with an initial value of 1, and when a new tree is opened, it is tagged with 2, and so on. The number 1, 2, 3, etc. are referred to as tree "generations." All new key insertions are written to the latest tree generation. When replicating, the tags are sent to the target site along with other metadata, and when a target site gets a new element to insert into the tree, it uses the tag it received to know where to insert the key. Thus, the process makes sure that the same elements should be distributed in the same way between the trees in both the source and target locations.

Figure 4A:
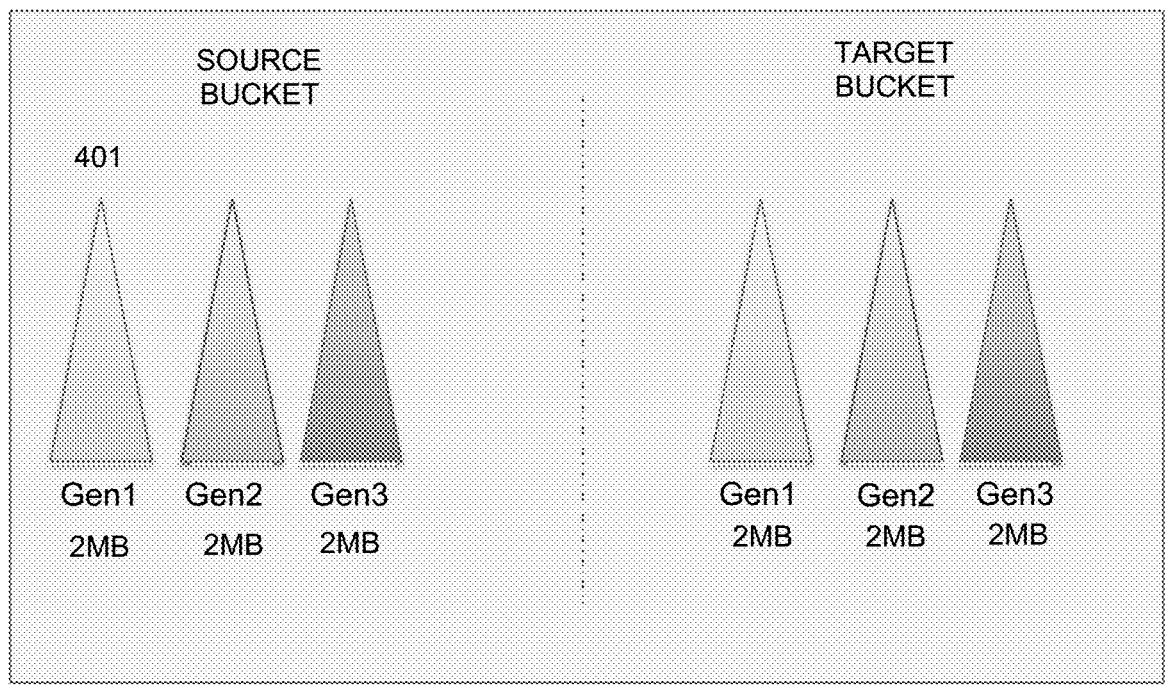
FIG. 4A illustrates the generation of same size additional Merkle trees between source and destination S3 buckets, under some embodiments.

FIG. 4A illustrates the generation of additional Merkle trees between source and destination S3 buckets, under an embodiment. As shown in FIG. 4A, a number of trees 401 are generated for both the source S3 bucket and the target S3 bucket. The generated trees are denoted sequentially as Gen1, Gen2, Gen3, and so on, for each of the source and target. The Gen1 tree of the source corresponds to the Gen1 tree of the target, the Gen2 tree of the source corresponds to the Gen2 tree of the target, and so on. For the example shown, all of the trees are configured to be of the same size, e.g., 2 MB.

Figure 4B:
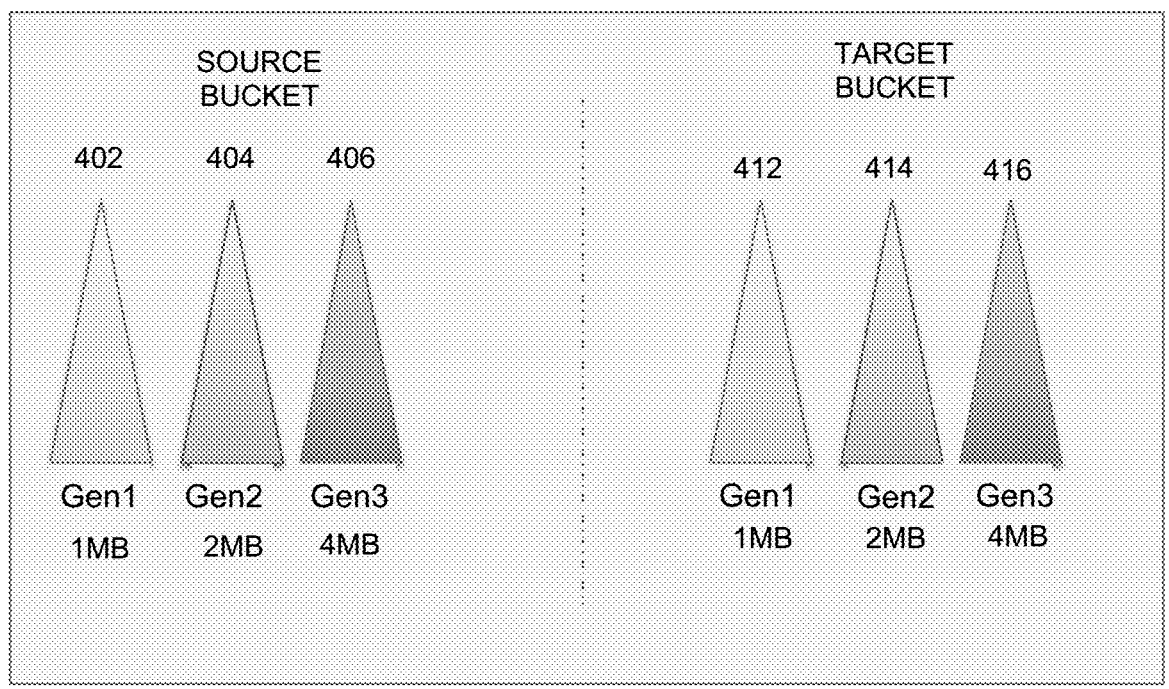
FIG. 4B illustrates the generation of different size additional Merkle trees between source and destination S3 buckets, under some embodiments

In an alternative embodiment, the size of at least some of the trees in different generations may be different. FIG. 4B illustrates the generation of additional Merkle trees between source and destination S3 buckets, under this alternative embodiment. As shown in FIG. 4B, the same Gen1, Gen2, and Gen3 trees are provided for each of the source bucket and target bucket. Instead of all being the same size, the trees increase in size as the generation number increases. Hence, for the example shown, Gen1 is 1 MB, Gen2 is 2 MB, and Gen3 is 4 MB. Since the source and generation trees must match, the same generation tree for each of the source and target must be the same. The increase in size may be configured to be a fixed amount, e.g., plus 1 or 2 MB per generation, or it may be arithmetic, such as doubling the size of the previous generation, as shown in the example of FIG. 4B, until a practical limit is reached, or some other formula to increase the size. In yet another embodiment, the size of a subsequent generation tree may be decreased from the previous generation.

Each tree in the series of generated trees is tagged with a unique Merkle Generation tag, which can be an sequential integer number, alphabetic character, or other alphanumeric character. In an embodiment, the tag comprises a key/value pair that is added to the object store. For the example of S3 buckets, the tagging syntax can be expressed as in the example pseudo-code sequence:

```
aws s3pi put-object-tagging \
 --bucket my-bucket \
 --key doc1.rtf \
 --tagging '{"TagSet": [{ "Key": "designation", "Value": "confidential" }]}'
```

In this example, the code will generate a tag as follows:
—tagging '{"TagSet":[{"Generation":7}, {TreeSize: size}]}'

The above example uses the AWS (Amazon Web Services) command line interface (CLI). However, there can be a programmatic version, as well. Furthermore, although embodiments are described with respect to Amazon S3 and AWS implementations, embodiments are not so limited and any other object or key-value storage system may be used.

Tagging also allows the process to delete older versions from the tree, such as when an existing key (PUT) is replaced, the process can extract the old generation tag that the key had and know from which tree it needs to be removed. It can then remove the old key from the old generation and place the new value in the new generation.

In a data replication scenario in which a disk with a first set of S3 buckets is to be copied to another disk to hold the copied S3 buckets, the respective set of disks and buckets are thus denoted source disk and target disk or source bucket and a target bucket. Each has a regular or sparse Merkle tree, and the synchronization process uses certain tree traversal techniques. In an embodiment, each of the source and target buckets perform a different process to execute the data movement and Merkle tree synchronization.

Figure 5:
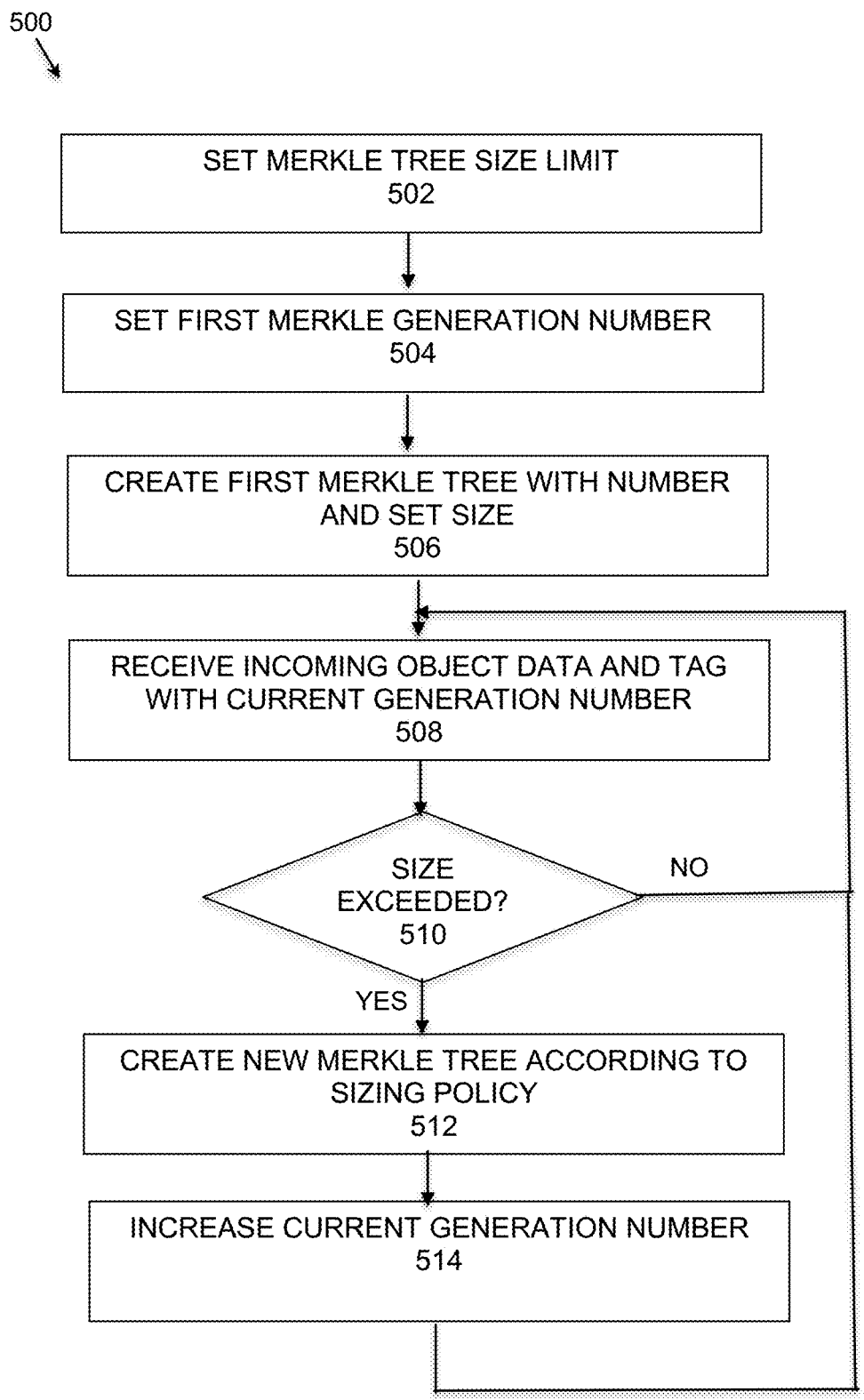
FIG. 5 is a flowchart that illustrates a method of synchronizing S3 buckets for a source disk, under some embodiments.

FIG. 5 is a flowchart that illustrates a method of synchronizing S3 buckets for a source disk, under some embodiments. Process 500 starts by deciding on and setting the size of the Merkle tree for the source disk or buckets, 502. As shown in FIG. 4A, such a size can be on the order of 2 MB, but any reasonable size from 1 MB to 8 MB, or more, can be used. The process next sets the tree number that represents the current generation, and identifies the tree keeping the elements of this generation, 504. The first tree can be denoted tree 1, tree A, etc. Thus, in an example, the process starts with currentGeneration=1. The first Merkle tree is then created according to the set size limit and with the first Merkle number, 506. The number can be stored in any appropriate manner and location for the data container holding the Merkle tree.

The created tree is now ready for data operations involving the source bucket. For an incoming operation on the bucket, the entering data is tagged with the current generation number of the Merkle tree, 508. The process checks, in determination step 510, whether the incoming data exceeds the size limit of the Merkle tree. If the size limit is not exceeded, the process proceeds from the receiving of the next object data, 508. If the size limit is exceeded, a new Merkle tree is allocated, as a next generation tree. The allocation process involves creating a new Merkle Tree bucket according to a sizing policy, 512, and increase the current generation number, 514. In an embodiment, the sizing policy dictates the size of subsequent created Merkle trees based on the size of the size limit set in step 502. The sizing policy could say that all Merkle trees are to be of the same size, as shown in FIG. 4A, or that the size of subsequent trees should be increased by a certain function, such as adding a constant size, or doubling the size of the previous tree, or other similar formulas. The process then proceeds from step 508 for further incoming object data.

With respect to the new tree allocation process, it should be noted that the process of FIG. 5 is asynchronous. A new tree is allocated as soon as it is first detected that the size limit of a present tree has been exceeded. Either the source site or the target site can cause a new tree to be allocated. Typically the source site initiates a new tree allocation, but delays may cause the target site instead to determine that a new tree is required.

With respect to the sizing policy, the process still requires the user to make an estimate on the number of elements in a tree, however compared to existing methods, the estimate can be much looser, and the system will adjust accordingly. For example, the estimate can be a bit low, and additional trees will be created as needed. Estimating far too low a number may still have ill effects as a lot of tree generations need to be created, and some efficiency may be lost. Likewise, estimating an excessively large tree size will be wasteful in cases where it is only partially filled. Therefore, some knowledge must be applied in estimating the right or most appropriate size number. The process can also apply some learning to the size estimation process. For example, it can start from a relatively small tree and make the trees bigger, as we more trees are created. An example heuristic, such as shown in FIG. 4B is to double the tree size every new generation time, or every second generation time. For this example, Gen 1 is with size M and Gen 2 with also be size M, however Gen 3 will be 2*M, as will be Gen 4, and then it is doubled again, and so on. Such as scheme provides a balance between size and growth. Any similar growth scheme can be utilized based on system constraints and requirements. Likewise if the initial tree estimates were too high, the next generation tree size could be decreased. It should be noted that there is freedom in choosing the sizes as long as the source and target coordinate or have the exact same size changing heuristic. This ensures that the trees in source and target of the same generation will have matching topology.

As shown in FIG. 5, once the Merkle tree is created, the incoming object data is received. This incoming data is subject to certain operations depending on the nature of the data, such as whether it is new data, updated data, or if existing data is to be deleted. FIG. 6 illustrates a set of operations for data in a Merkle tree forest, under some embodiments. As shown in FIG. 6, process 650 includes a POST operation that is used to create a new object. The POST operation 652 enters the element key and hash of the value to the current Merkle tree. The generation number is marked in the object metadata in S3. A PUT operation 654 updates an existing object. For this operation, the process deletes its previous version from the Merkle tree in which the previous version resides. Therefore, it will read the generation from the metadata of the current object and use it to find the proper tree in which this version resides, and will delete it from there. A new object for the data is then created using the POST operation. A DELETE operation 656 deletes an existing object. For this operation, the process fetches the generation tag from exiting S3 object, and deletes it from the relevant tree. The process then proceeds with a POST for any new data.

Figure 7:
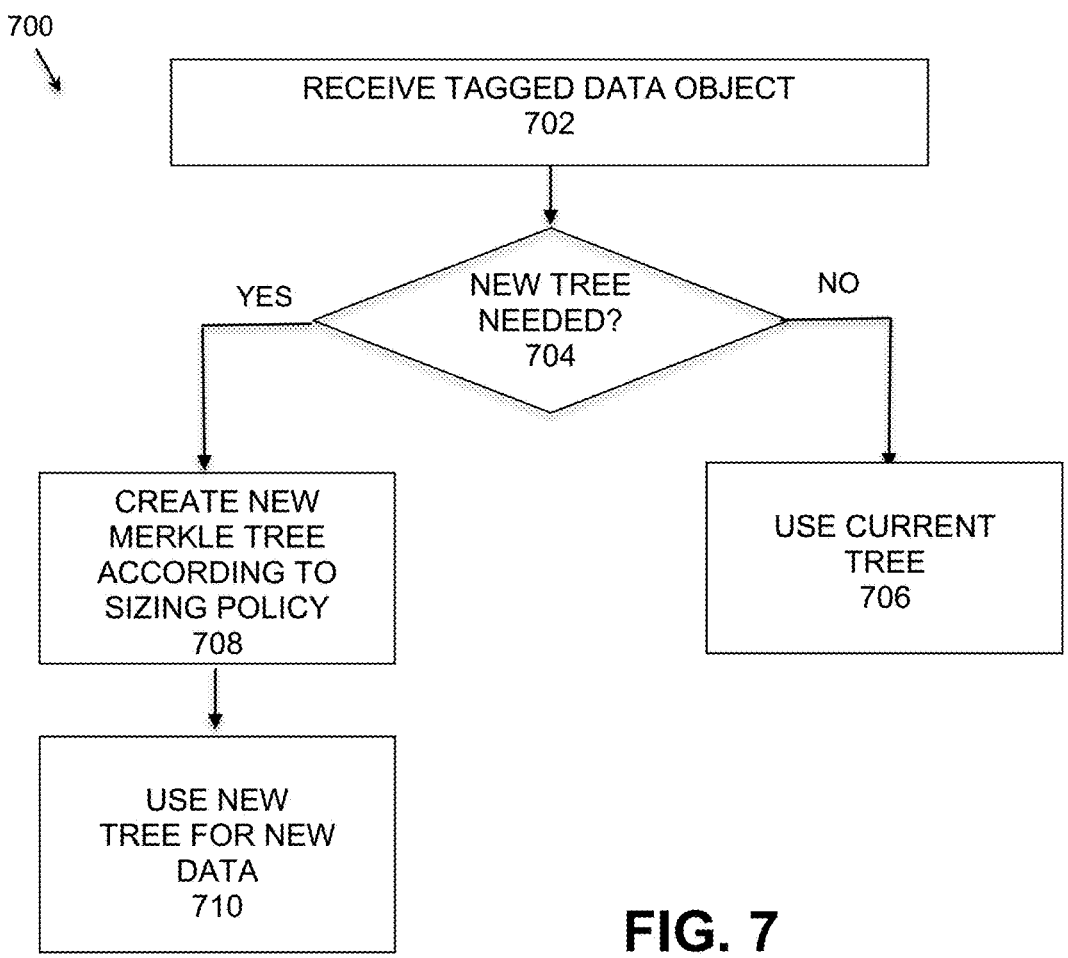
FIG. 7 is a flowchart that illustrates a method of synchronizing S3 buckets for a target disk, under some embodiments.

As stated above, the source and target disks or sites perform a different process to execute the data movement and Merkle tree synchronization. FIG. 5 illustrated the operation of a source disk, and FIG. 7 is a flowchart that illustrates a method of synchronizing S3 buckets for a target disk, under some embodiments. As shown in FIG. 7, process 700 starts with the target receiving a tagged data object, 702. Since the target receives an object that is already tagged, it should not keep a global number of current generation or keep track of the number of elements in the current bucket. However, it should create a new tree if it has a member with a generation tag for which no tree exists. Thus, in step 704, process 700 determines if a new tree is needed from the target side. This determination is made by reading the generation tag of the received data. During replication, the source sends the generation tag along with the object metadata. If a new generation value is received as compared to the current tree for the target side, a new tree is needed. If the tagged generation value matches or is for an earlier tree, no new tree is needed, and the target uses the current generation Merkle tree for the data replication, 706. If a new tree is needed, the process creates the tree, 708. The tree created by the target is sized according to the defined sizing policy, as described above. The target then places the new data in the new tree, 710. This mechanism ensures that the number of trees in the source and target per time will match, and that the topology on the trees in the source and target match, and further that the keys in each tree is the same in both source and target.

Merkle Tree Mapping

Figure 8:
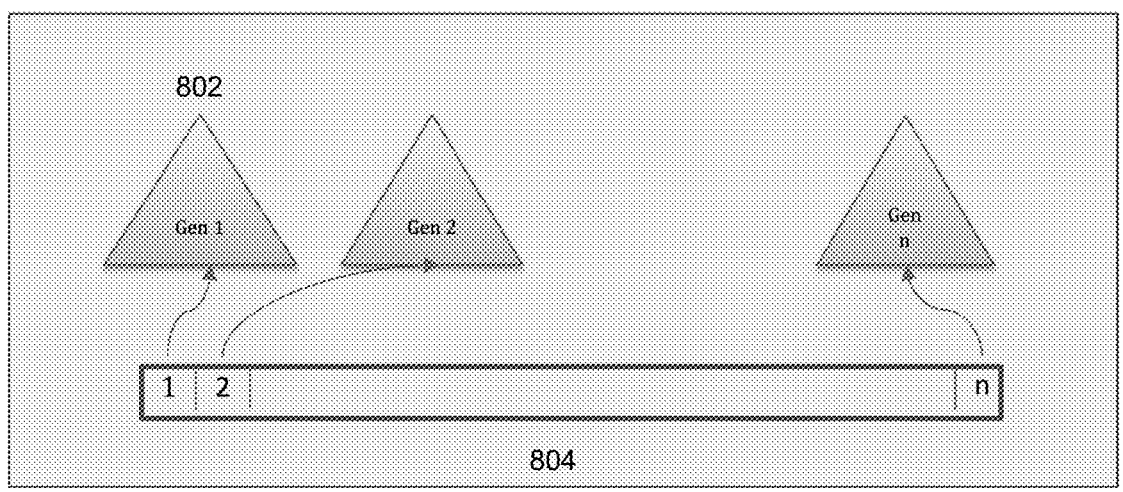
FIG. 8 illustrates an example data array that maps generation numbers to Merkle trees, under some embodiments.

To find the proper tree according to new tree generation within a number or "forest" of Merkle trees, there must be some mapping between the generation number and the corresponding Merkle Tree. In an embodiment, the process maintains a data array or a table in which each entry represents a generation and points to the relevant tree. It can be a simple array or a hash table. FIG. 8 illustrates an example data array that maps generation numbers to Merkle trees, under some embodiments. When a new element is created in the object store, it comes with a generation number tag that indicates the number of the Merkle Tree to which it belongs. As shown in FIG. 8, a number of trees 802 denoted Gen1 to Genn are provided in a forest of generated new trees. Data array 802 has n sequential entries, where each entry points to the appropriate and corresponding Merkle tree, as shown.

In an embodiment, synchronization of the source and target disks or sites uses the table or data array of FIG. 8 to produce the list of Merkle Trees in both sites. If there is a whole tree that exists in one site, but not on the other, the whole tree is synchronized (copied over). In the case of a partial tree, a synchronization is performed for each generation according to the related tree, as described above with respect to the sparse Merkle tree embodiment. The synchronization process using tables is typically be very efficient. Older generation trees seldom get updated, and therefore it is highly likely that the root hash will match between source and target and there is no need to do anything on the tree. Only the latest generation tree (and maybe the one before) will likely have changes that require the synchronization process.

In an alternative embodiment, mapping of generation number tags to Merkle trees can be implemented through a tree of trees or Merkle "super tree" structure. This embodiment effectively "re-roots" in a tree of trees once the number of trees grows past a defined limit. Each sub-tree will still be the original generation, and the new root will point to the tree according to generation. The advantage of this mechanism is that there will be a smaller number of trees to manage. Placing new keys in the combined tree will require knowing the proper generation in order to place it in the correct sub-tree. The hash of the key will be the original hash placed for the specific sub-tree.

In this embodiment, the system will maintain a tree of Merkle trees in what is referred to as a "super Merkle tree" or "super tree" that can be seen as a tree in which the original Merkle Trees are leaves and the intermediate nodes serve as a way to find quickly the needed Merkle tree, but also contain the hash of its children in the tree for a fast comparison between two such trees.

Figure 9:
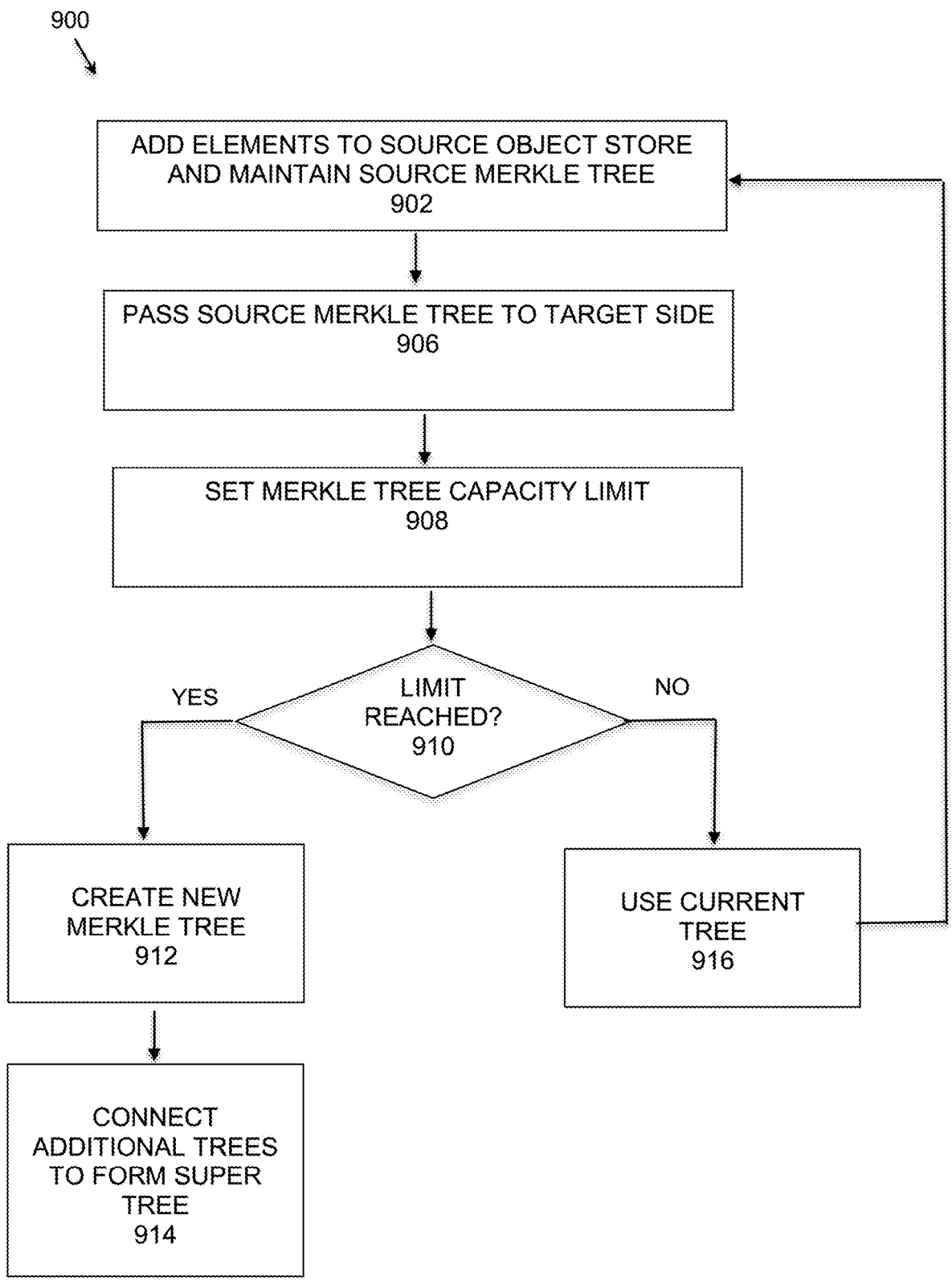
FIG. 9 is a flowchart that illustrates a process of synchronizing two S3 disks using a Merkle super tree, under some embodiments.

FIG. 9 is a flowchart that illustrates a process of synchronizing two S3 disks using a Merkle super tree, under some embodiments. Process 900 of FIG. 9 begin with the first generation of Merkle tree in which elements are added to the object store on the source site, and the source Merkle tree is appropriately maintained, 902. The Merkle tree from the source is then passed to the target site and the process maintains the same Merkle Tree, 906. A limit on the number of trees may be set, as shown in step 908. For example, the system may be configured to allow only a certain number (M) elements in the tree and it builds the tree to adjust to this limit. In step 910, it is determined whether this limit has been reached, and if not the process proceeds using the current tree, 916, and adding any new subsequent elements, 902.

Figure 10A:
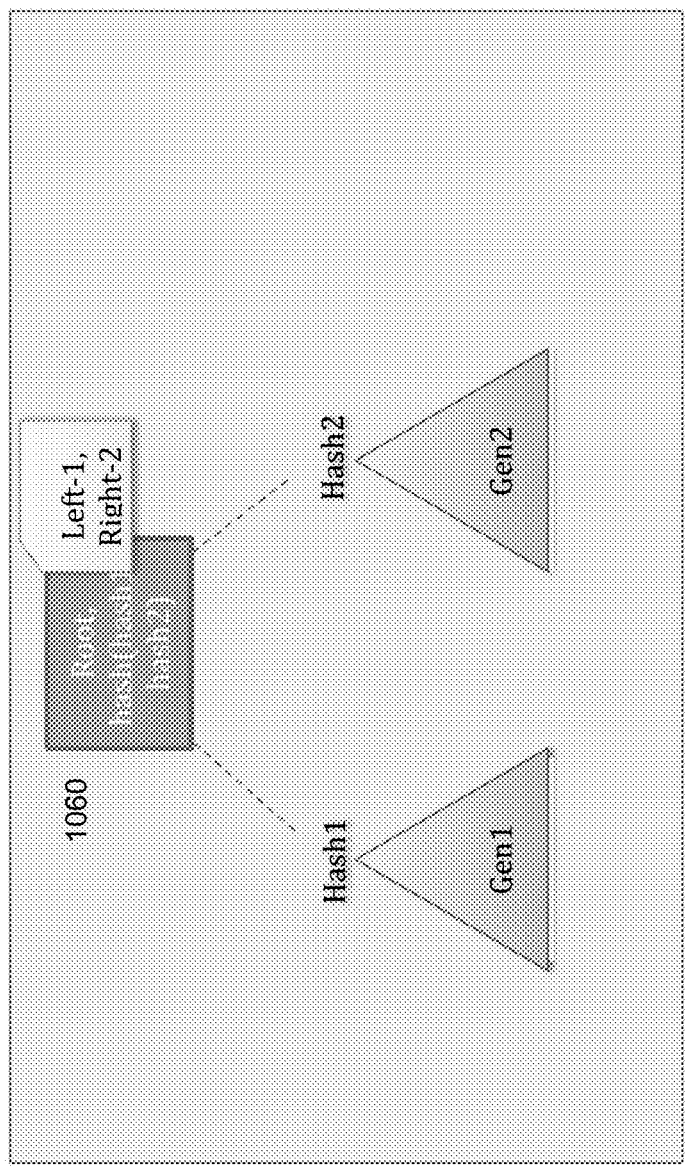
FIG. 10A illustrates an example super Merkle tree, under some embodiments.

When the limit of the Merkle tree capacity is reached as determined in decision block 910, a new tree is built, 912. The second added tree will be called Gen2, the third added tree will be called Gen3, and so on. These additional trees are connected to form a super tree, 914. FIG. 10 illustrates an example super tree, under some embodiments. The example super tree of FIG. 10 is of size 2, though embodiments are not so limited and any practical number of trees may be included. The super Merkle tree of FIG. 10A comprises a tree built on top of the original Merkle trees Gen1 and Gen2, where Gen2 was a newly built tree to be connected to the Gen1 tree. Each node in this super tree has the hash of its child hashes and also an information regarding the generations of its children, so that they can be easily navigated to quickly find the correct generation. In the example of FIG. 10, there are only two leaves from the root node 1060, so the left is kept as 1 and the right tree is kept as 2. If there is a bigger tree with 2 k Merkle trees as leaves, it will keep in the parent node left [1–k], and right [k+1, 2k]. This information can be kept more compactly, i.e., by just keeping the smallest generation of each child, left–1, right k+1.

Figure 10B:
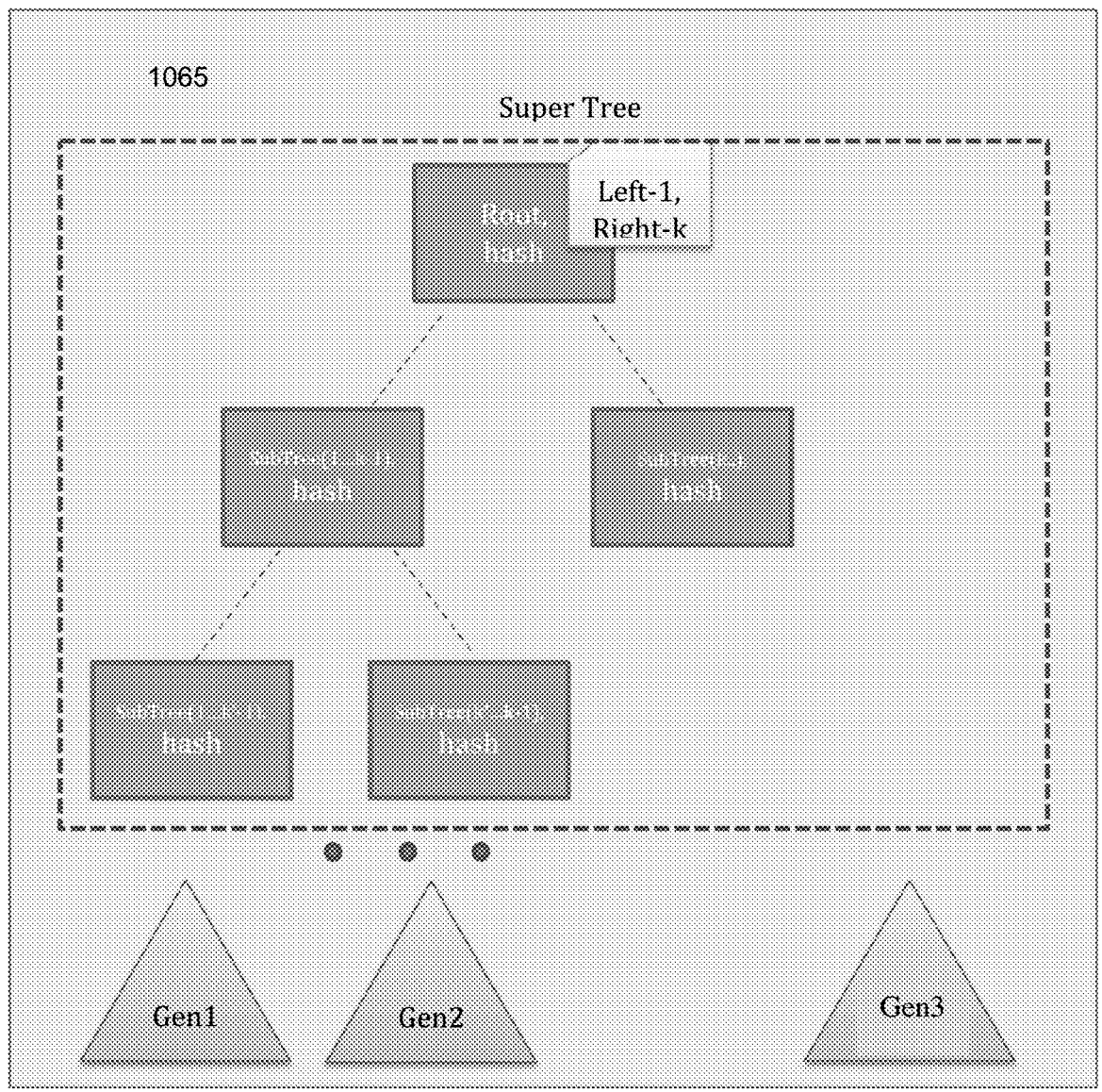
FIG. 10B illustrates an example of adding a new Merkle tree to a super Merkle tree, under some embodiments.

The use of super trees requires specific steps to maintain and sync the super trees. In the case of adding a new element (e.g., generation j), the process first find the tree by traversing the super tree. We look for it in the left child sub-tree if j falls in the range of the left child, and in the right child sub-tree if it falls in the range of the right child. When the proper tree is found, the process proceeds until it reaches a node indicating that the found tree is the Merkle tree itself. Next, the process checks to if the current tree has enough capacity to add data. If so, the elements are simply added to the tree. If the tree does not have capacity, the process starts a new tree corresponding to a new generation. Adding a new Merkle Tree causes an update in the super tree. If the size of leaves in the super tree is $2^k$ (full binary tree), it creates a new root, whose children are the current root and either the added Merkle Tree (for k=0) or an artificial node that will have only one left child, which in turn can be the tree (k=1), or it can have another child, and so on. FIG. 10B illustrates an example of adding a new Merkle tree to a super tree 1065, such as shown in FIG. 10A, under some embodiments. The process should also update the hashes of the path to the new leaf (Merkle Tree). The example of FIG. 10B shows a new Merkle tree denoted Gen3 added to super tree 1065 that already has Gen1 and Gen2 Merkle trees.

Figure 10C:
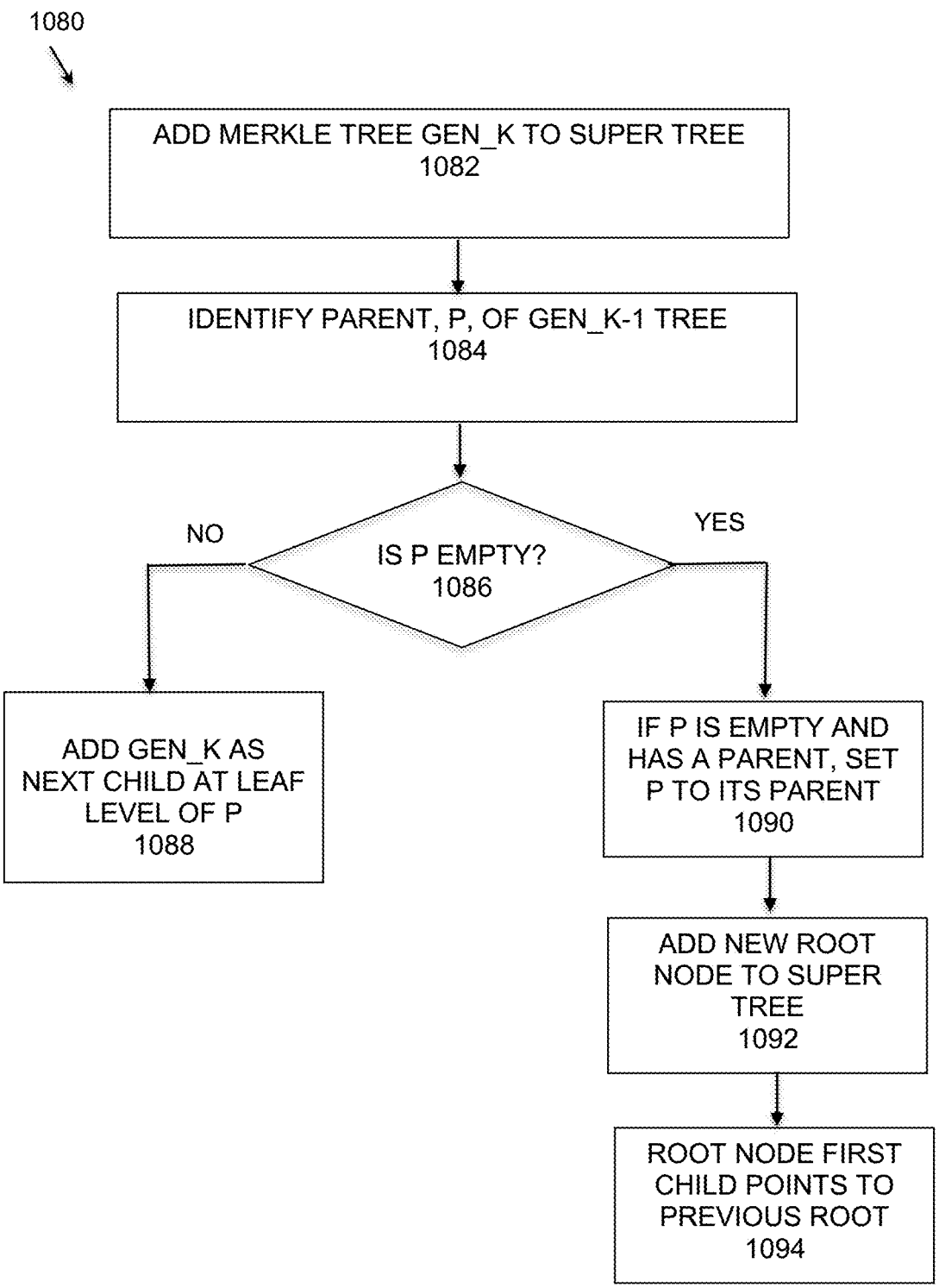
FIG. 10C is a flowchart that illustrates adding a Merkle tree to a super Merkle tree, under some embodiments.

During the tree addition process, when the super tree 1065 is full (or the first Merkle tree if there is only gen1) another Merkle tree is added with its size according to the sizing policy. This tree will be attached to a leaf of the super tree according to the process illustrated in FIG. 10C. FIG. 10C is a flowchart that illustrates adding a Merkle tree to a super Merkle tree, under some embodiments. The process 1080 assumes that a tree of GenK is being added to the super tree, 1082, and the process identifies P, the parent of GenK–1. In decision block 1086 it is determined whether or not the parent is empty or full. If P is not empty and P has vacant children, GenK is added as the next child at the leaf level of P, 1088. For example, this can be done by adding descendant nodes recursively until it reaches the leaves of the tree and then add GenK to that node. If P is empty and if P has a parent then set P to its parent and start from the top of the process, 1090. Otherwise, the process adds a new root node to the super tree, 1092. The root node first child points to the previous root (P), 1094, where P=new root, and then the process repeats from the top of the process.

In this process, descendent nodes are added recursively, such that all Merkle trees are leaves in the super tree, and they are all added at the same level in the tree. When a new super tree node is added (root or internal), it needs to get super node children added all the way down to the leaf level, and only then can the new (GenK) tree be attached to the super tree. The reason to check if P is empty is to handle the case of Gen1 when Gen2 is added. At this point, there is no super tree, as Gen1 has no parent, so it is treated the same as when the super tree is full. Adding root nodes or internal nodes in this way in the super tree does not alter anything in the existing parts of the super tree. There are no recalculations nor movements, and therefore, hashes only need to be calculated for the nodes being added; there is no change in existing nodes. Although embodiments have been described with respect to binary trees, a similar method can be applied to more complex tree structures.

A similar process to the addition process described above can used if an element needs to be deleted. For example, if an element of generation j needs to be deleted, the process finds the tree, by traversing the super tree. It looks for it in the left child sub-tree if j falls in the range of the left child, and in the right child sub-tree if it falls in the range of the right child. When the proper tree is found, the process proceeds until it reaches a node indicating that this is the Merkle Tree itself. The found element is then deleted.

Synchronizing Merkle trees between the source and target sites using the super tree implementation is a relatively easy process, since the super tree is a Merkle tree in its own right. The synchronization process for the two super trees uses the hashes on the nodes as expected in Merkle tree sync processes.

Embodiments of the present method and system use Merkle trees for S3 bucket synchronization. They overcome certain shortcomings of previous systems using a sparse tree of a fixed size, such as scale, waste and the need to make decisions by the user, by having a list of trees, in which each tree can be synchronized separately by keeping a strict division to trees according to generation number. The generation is passed from a source site to a target site during replication operations. The tagging of the generation number also makes it easy and efficient to remove an older version of an element or deal with deleted elements. This allows efficient syncing between two data object buckets without a size limitation on number of elements in a bucket.

Although embodiments are described with respect to sparse Merkle trees, it should be noted that other or non-sparse Merkle trees can also be used.

System Implementation

Figure 11:
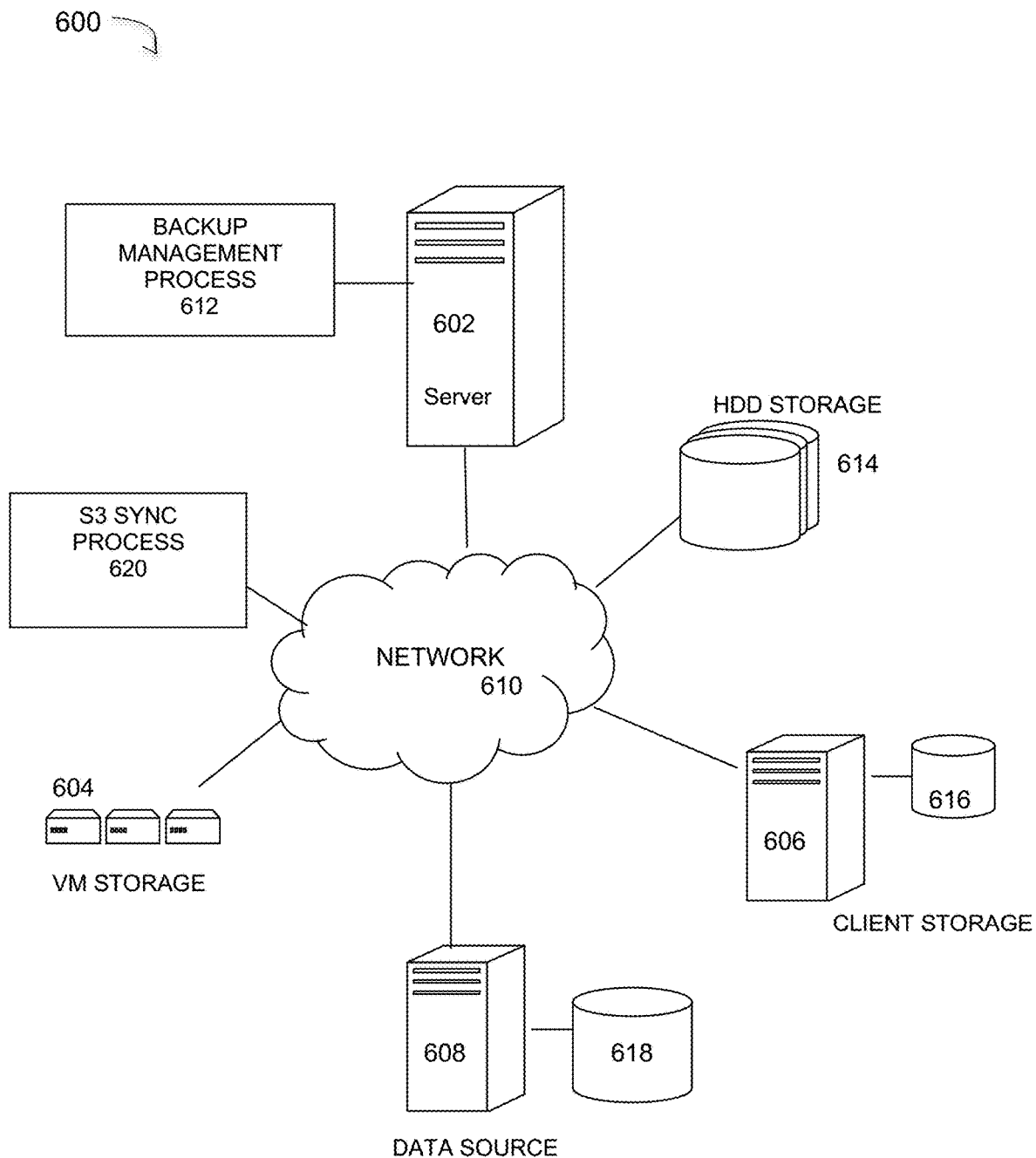
FIG. 11 is a block diagram of a computer network that implements an S3 sync process for unlimited size Merkle trees, under some embodiments.

FIG. 11 is a block diagram of a computer network that implements an S3 data store synchronization process, under some embodiments. This network may represent an implementation that performs a data replication processes between computers, networks, storage media (e.g., disks), storage servers, data buckets, and so on, along with other data backup processes. In system 600, a backup server 602 executes a backup management process 612 that coordinates or manages the backup of data from one or more data sources 608 to storage devices (e.g., HDD (hard disk drives) or SSD (solid-state drives)), network storage, client storage 606, and/or virtual storage devices 604. With regard to virtual storage 614, any number of virtual machines (VMs) or groups of VMs may be provided to serve as backup targets. The various storage devices serve as target storage devices for data backed up from one or more data sources, such as computer 608, which may have attached local storage 618 or utilize networked accessed storage devices 614. Data source 608 represents one of many possible backup agents that initiate save sessions to backup their data to storage devices on the network 600 through the backup server 602 and backup management process 612.

The data may be locally sourced or remotely sourced, and the client 608 may initiate save or backup sessions on an automatically scheduled basis or a manually initiated basis. In a data protection scenario, client 108 usually initiates data backups (e.g., full, incremental, differential, etc.) on a regular periodic schedule, such as hourly, daily, weekly, and so on. The sourced data may be any type of data, such as database data that is part of a database management system. In this case, the data may reside on one or more hard drives (e.g., 618) and may be stored in the database in a variety of formats. One example is an Extensible Markup Language (XML) database, which is a data persistence software system that allows data to be stored in XML format. Another example is a relational database management system (RDMS) that uses tables to store the information. Computer 608 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

A network server computer 602 is coupled directly or indirectly to the network storage devices 614, client storage 616, data sources 608, and VMs 604 through network 610, which may be a cloud network, LAN, WAN or other appropriate network. Network 610 provides connectivity to the various systems, components, and resources of system 600, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform. In an embodiment, system 600 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 600 may be stored in any number of persistent storage locations and devices, such as local client storage, server storage (e.g., 618). The backup management process 612 causes or facilitates the backup of this data to other storage devices of the network, such as network storage 614 which may at least be partially implemented through storage device arrays, such as RAID components. In an embodiment network 600 may be implemented to provide support for various storage architectures such as storage area network (SAN), Network-attached Storage (NAS), or Direct-attached Storage (DAS) that make use of large-scale network accessible storage devices 614, such as large capacity disk (optical or magnetic) arrays.

For the embodiment of FIG. 6, network system 600 includes a server or other resource that executes an object store (S3) sync process 620 to perform the system configuration and data syncing processes and operations described herein. In an embodiment, the process works on data that is represented in tree structure format, and processed accordingly. For example, process may manage one or more Merkle trees, or any other similar tree-based data structure. In an embodiment, system 600 may represent a Data Domain Restorer (DDR)-based de-duplication s r system, and storage server 602 may be implemented as a DDR De-duplication Storage server provided by EMC Corporation. However, other similar backup and storage systems are also possible.

With respect to the flowcharts of FIGS. 5, 6, 7, and 9, the functional steps may be performed by hardware processing components provided by one or more of the servers or resources of system 600 of FIG. 11. Such components may be provided or embodied as part of backup process/component 112 and S3 sync process/component 620. Such components may be embodied as one or more (first, second, third, etc.) hardware, processing, or programmed circuits configured to execute program instructions to perform a certain task, interfaces to transmit and receive data within a computer (node) or between computers (nodes), co-processors to perform subroutines or sub-tasks, and other similar components.

Embodiments of the processes and techniques described above can be implemented on any appropriate backup system operating environment or file system, or network server system. Such embodiments may include other or alternative data structures or definitions as needed or appropriate.

Figure 12:
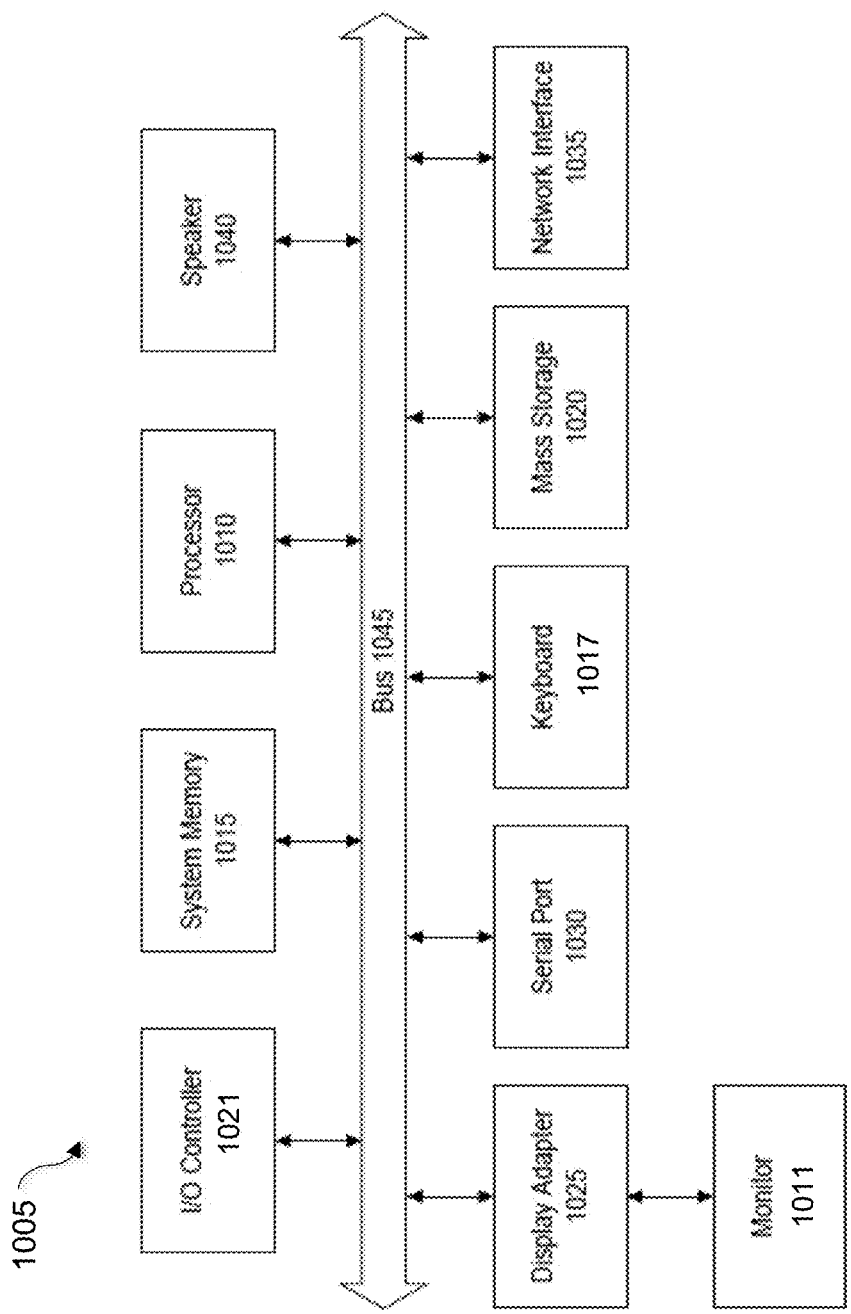
FIG. 12 is a block diagram of an example computer executing processes under some embodiments.

The network of FIG. 11 may comprise any number of individual client-server networks coupled over the Internet or similar large-scale network or portion thereof. Each node in the network(s) comprises a computing device capable of executing software code to perform the processing steps described herein. FIG. 12 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 12 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®, family of systems (e.g., Windows Server), Linux, Mac OS X, IRIX32, or IRIX64. Other operating systems may be used. Microsoft Windows is a trademark of Microsoft Corporation.

In this specification, these implementations, or any other form that the embodiments may take, may be referred to as techniques. In general, the order of the steps of disclosed processes may be altered within the scope of the invention.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of synchronizing object data between a source site and a target site, comprising:
    creating, in each of the source and target sites, an initial Merkle tree having a fixed size with each node having a hashed value of the metadata for the node and that of any children of that node;
    receiving data to be stored in the initial Merkle tree until the fixed size is reached;
    creating, upon reaching the fixed size, additional Merkle trees each of a respective fixed size in a sequence of successive additional Merkle trees as each additional Merkle tree receives data in excess of its respective fixed size, each additional Merkle tree having a unique generation number;
    maintaining the initial Merkle tree and each additional Merkle tree in a super Merkle tree containing Merkle tree leaves, wherein each node of the super Merkle tree has a hash of its child hashes and information regarding its respective generation number;
    determining, by traversing the super Merkle tree the existence of any missing additional Merkle trees that are in the source site but not in the target site;
    copying data of the missing additional Merkle trees from the source site to the target site using hashes on the nodes through a Merkle tree synchronization process;
    identifying a parent of a next previous generation tree to the added tree;
    determining whether or not the parent is empty or full;
    adding, if the parent not empty and the parent has vacant children, the added tree to the next child at the leaf level of the parent; and
    setting, if the parent is empty, and itself has a parent then set the parent to its parent, or, if the parent does not have a parent, adding a new root node to the super Merkle tree wherein a first child points to the previous root node.

2. The method of claim 1 the object data comprises Amazon Simple Storage Service (S3) data, and further wherein the Merkle tree is a sparse Merkle tree wherein a hash of an empty node is defined as zero, and includes nodes within the Merkle tree.

3. The method of claim 1 wherein the fixed size of the initial Merkle tree is of size $M=c*n$, wherein n is a maximum allowed number of elements in the bucket, and c is a single-digit integer constant.

4. The method of claim 3 wherein a size of each subsequent Merkle tree is the same size of the initial Merkle tree.

5. The method of claim 4 wherein a size of each subsequent Merkle tree increases relative to the size of the initial Merkle tree according to a defined sizing policy, and wherein the defined sizing policy comprises one of: increasing a subsequent Merkle tree size by a constant multiplier, or doubling a size of each subsequent Merkle tree or group of Merkle trees after the initial Merkle tree.

6. The method of claim 1 wherein the Merkle tree synchronization process comprises: recursively scanning child nodes of the missing additional Merkle trees to identify data blocks that have different hashes; and
sending data corresponding to the different hashes from the source node to the target node.

7. The method of claim 1 wherein the unique generation number is stored as object metadata for each S3 data object.

8. The method of claim 7 wherein a new object of the received data is created in a POST operation by entering an element key and hash of the object value to a current Merkle tree, an existing data object is updated in a PUT operation by deleting its previous version from a previous Merkle tree in which the previous version resides, and an existing data object is deleted in a DELETE operation by fetching a corresponding generation tag for the existing data object and deleting it from the corresponding Merkle tree.

9. The method of claim 1 further comprising:
receiving, in the target site, replicated data from the source;
traversing the super Merkle tree to find a current Merkle tree;
adding the replicated data to the current Merkle tree if it has sufficient space; and
creating a new Merkle tree in the super Merkle tree if it does not have sufficient space, and updating hashes of a path to the new Merkle tree.

10. A method of synchronizing object stores in a data backup system, comprising:
maintaining a tree of fixed-size Merkle trees for a source site and a target site;
maintaining a super Merkle tree containing the fixed-size Merkle trees, wherein each node of the super Merkle tree has a hash of its child hashes and information regarding its respective generation number;
receiving data to be replicated from the source site to the target site;
storing the received data in a current Merkle tree of the sequence of Merkle trees;
creating new Merkle trees as the received data exceeds the fixed size of the current Merkle tree, wherein each new Merkle tree is assigned a unique generation number;
updating hashes of a path to the new Merkle trees;
identifying a parent of a next previous generation tree to an added tree;
determining whether or not the parent is empty or full;
adding, if the parent not empty and the parent has vacant children, the added tree to the next child at the leaf level of the parent; and
setting, if the parent is empty, and itself has a parent then set the parent to its parent, or, if the parent does not have a parent, adding a new root node to the super Merkle tree wherein a first child points to the previous root node.

11. The method of claim 10 wherein the object data comprises Amazon Simple Storage Service (S3) data, and further wherein the Merkle tree is a sparse Merkle tree wherein a hash of an empty node is defined as zero, and includes nodes within the Merkle tree.

12. The method of claim 11 wherein a size of each subsequent Merkle tree is the same size of the initial Merkle tree.

13. The method of claim 12 wherein a size of each subsequent Merkle tree increases relative to the size of the initial Merkle tree according to a defined sizing policy, and wherein the defined sizing policy comprises one of: increasing a subsequent Merkle tree size by a constant multiplier, or doubling a size of each subsequent Merkle tree or group of Merkle trees after the initial Merkle tree.

14. The method of claim 13 wherein the unique generation number is stored as object metadata for each S3 data object.

15. The method of claim 14 wherein a new object of the received data is created in a POST operation by entering an element key and hash of the object value to a current Merkle tree, an existing data object is updated in a PUT operation by deleting its previous version from a previous Merkle tree in which the previous version resides, and an existing data object is deleted in a DELETE operation by fetching a corresponding generation tag for the existing data object and deleting it from the corresponding Merkle tree.

16. The method of claim 10 wherein an initial Merkle tree of the tree of fixed-size Merkle trees is denoted as Generation 1, a second Merkle tree of the tree of fixed-size Merkle trees is denoted as Generation 2, a third Merkle tree of the tree of fixed-size Merkle trees is denoted as Generation 3, and a fourth Merkle tree of the tree of fixed-size Merkle trees is denoted as Generation 4.

17. The method of claim 16 wherein newly received data is input to a latest generation Merkle tree of the tree of fixed-size Merkle trees.

18. A computer program product, comprising a non-transitory computer-readable medium having a computer-readable program code embodied therein, the computer-readable program code adapted to execute a method of synchronizing object stores in a data backup system, comprising:
maintaining a tree of fixed-size Merkle trees for a source site and a target site;
maintaining a super Merkle tree containing the fixed-size Merkle trees, wherein each node of the super Merkle tree has a hash of its child hashes and information regarding its respective generation number;
receiving data to be replicated from the source site to the target site;
storing the received data in a current Merkle tree of the sequence of Merkle trees;
creating new Merkle trees as the received data exceeds the fixed size of the current Merkle tree, wherein each new Merkle tree is assigned a unique generation number;
updating hashes of a path to the new Merkle trees;
identifying a parent of a next previous generation tree to the added tree;
determining whether or not the parent is empty or full;
adding, if the parent not empty and the parent has vacant children, the added tree to the next child at the leaf level of the parent; and
setting, if the parent is empty, and itself has a parent then set the parent to its parent, or, if the parent does not have a parent, adding a new root node to the super Merkle tree wherein a first child points to the previous root node.

* * * * *